(12) United States Patent
Seo

(10) Patent No.: US 12,066,877 B2
(45) Date of Patent: Aug. 20, 2024

(54) WEARABLE DEVICE, WORN/REMOVED DETERMINATION METHOD, AND NON-TRANSITORY RECORDING MEDIUM

(71) Applicant: CASIO COMPUTER CO., LTD., Tokyo (JP)

(72) Inventor: Munetaka Seo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 58 days.

(21) Appl. No.: 17/669,739

(22) Filed: Feb. 11, 2022

(65) Prior Publication Data

US 2022/0308646 A1 Sep. 29, 2022

(30) Foreign Application Priority Data

Mar. 24, 2021 (JP) .................................. 2021-049794

(51) Int. Cl.
| | |
|---|---|
| *G06F 1/26* | (2006.01) |
| *G04G 9/00* | (2006.01) |
| *G04G 17/06* | (2006.01) |
| *G04G 21/02* | (2010.01) |

(52) U.S. Cl.
CPC ............... *G06F 1/26* (2013.01); *G04G 9/007* (2013.01); *G04G 17/06* (2013.01); *G04G 21/02* (2013.01)

(58) Field of Classification Search
None
See application file for complete search history.

(56) References Cited

U.S. PATENT DOCUMENTS

| | | | |
|---|---|---|---|
| 2009/0069724 A1 | 3/2009 | Otto et al. | |
| 2013/0053661 A1* | 2/2013 | Alberth | A61B 5/1455 600/390 |
| 2016/0038055 A1* | 2/2016 | Wheeler | A61B 5/7225 600/301 |
| 2017/0000415 A1* | 1/2017 | Lapetina | A61B 5/02438 |
| 2018/0103901 A1* | 4/2018 | Gandhi | G06F 3/015 |
| 2018/0145401 A1* | 5/2018 | DeBates | G06K 19/07764 |
| 2018/0360326 A1 | 12/2018 | Lee et al. | |
| 2021/0219864 A1* | 7/2021 | Eom | A61B 5/681 |
| 2022/0233142 A1* | 7/2022 | Hasan | A61B 5/681 |

FOREIGN PATENT DOCUMENTS

JP 2016129526 A 7/2016

OTHER PUBLICATIONS

Japanese Office Action dated Jun. 7, 2022 (and English translation thereof) issued in counterpart JP Application No. 2021-049794.

* cited by examiner

*Primary Examiner* — Danny Chan
(74) *Attorney, Agent, or Firm* — Holtz, Holtz & Volek PC

(57) ABSTRACT

A wearable device includes a multi-use circuit that includes a terminal provided so as be able to be close to a subject and that is capable of being used for both (i) a determination function that determines whether the wearable device is being worn on the subject and (ii) a predetermined function other than the determination function, and a processor configured to execute the determination function.

19 Claims, 11 Drawing Sheets

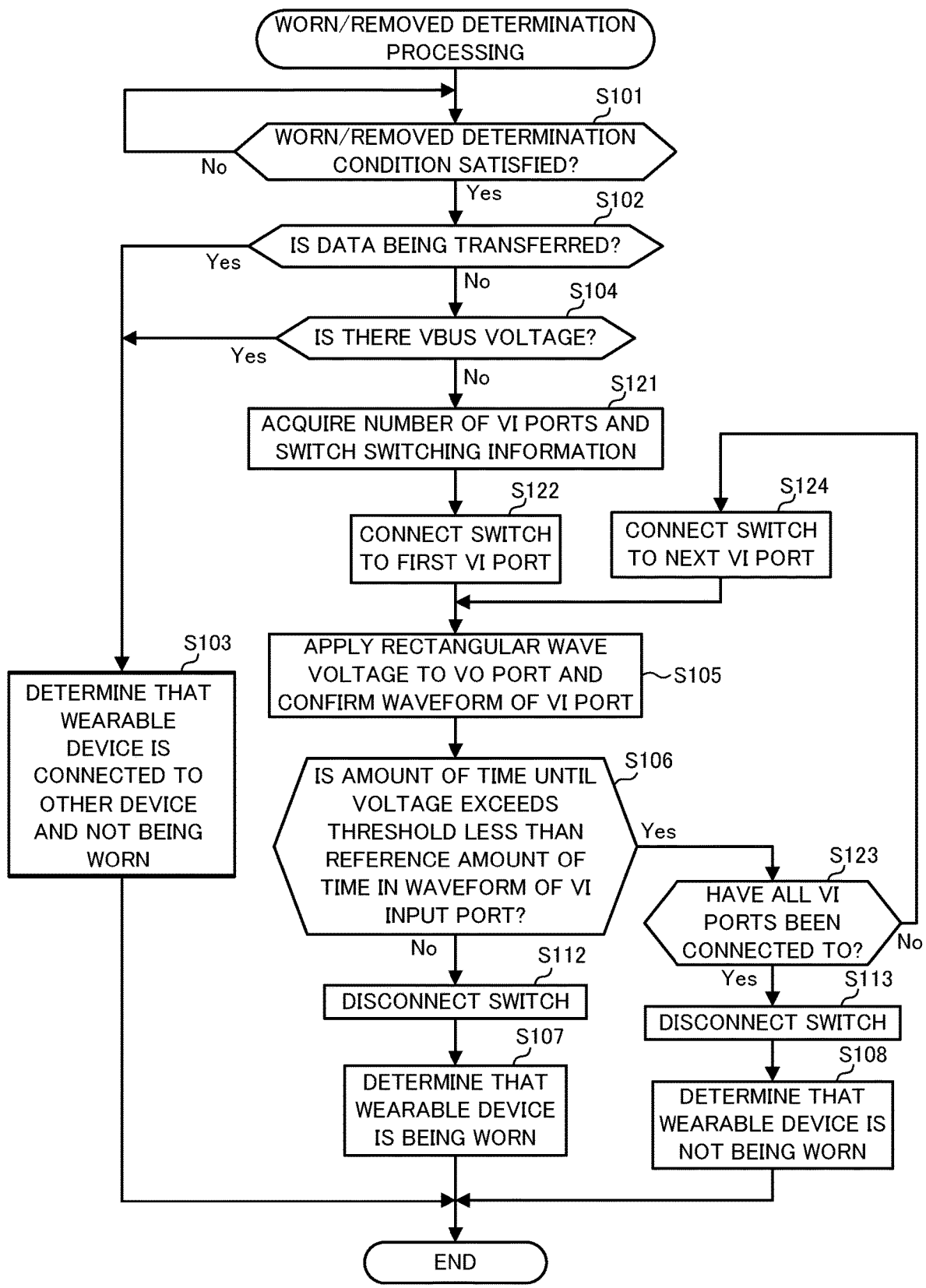

WEARABLE DEVICE, WORN/REMOVED DETERMINATION METHOD, AND NON-TRANSITORY RECORDING MEDIUM

CROSS-REFERENCE TO RELATED APPLICATION

This application claims the benefit of Japanese Patent Application No. 2021-49794, filed on Mar. 24, 2021, the entire disclosure of which is incorporated by reference herein.

FIELD

This application relates generally to a wearable device, a worn/removed determination method, and a non-transitory recording medium.

BACKGROUND

In recent years, there has been an increase in wearable devices that can be worn on and removed from a human body and that are provided with functions for which security must be ensured. Example of such functions include electronic payment functions. One example of such a device is a smartwatch. With such devices, one method that is frequently used to enhance security includes determining whether the device is being worn on a human body and, when a detection (removed detection) indicating that the device is removed from the human body is made, the device is locked so that the device is not used by another person without permission. Japanese Patent Application Publication No. 2016-129526 describes an example of a device that is provided with such a function of determining whether or not a device is being worn. Japanese Patent Application Publication No. 2016-129526 describes a wristwatch-type pulse measuring device that starts measuring a pulse after confirming that the device is being worn by a user.

SUMMARY

An aspect of the present disclosure is a wearable device including a multi-use circuit that includes a terminal provided so as be able to be close to a subject and that is capable of being used for both (i) a determination function that determines whether the wearable device is being worn on the subject and (ii) a predetermined function other than the determination function, and a processor configured to execute the determination function.

BRIEF DESCRIPTION OF THE DRAWINGS

A more complete understanding of this application can be obtained when the following detailed description is considered in conjunction with the following drawings, in which:

FIG. 11 is a flowchart of worn/removed determination processing according to Embodiment 3.

DETAILED DESCRIPTION

Figure 1:
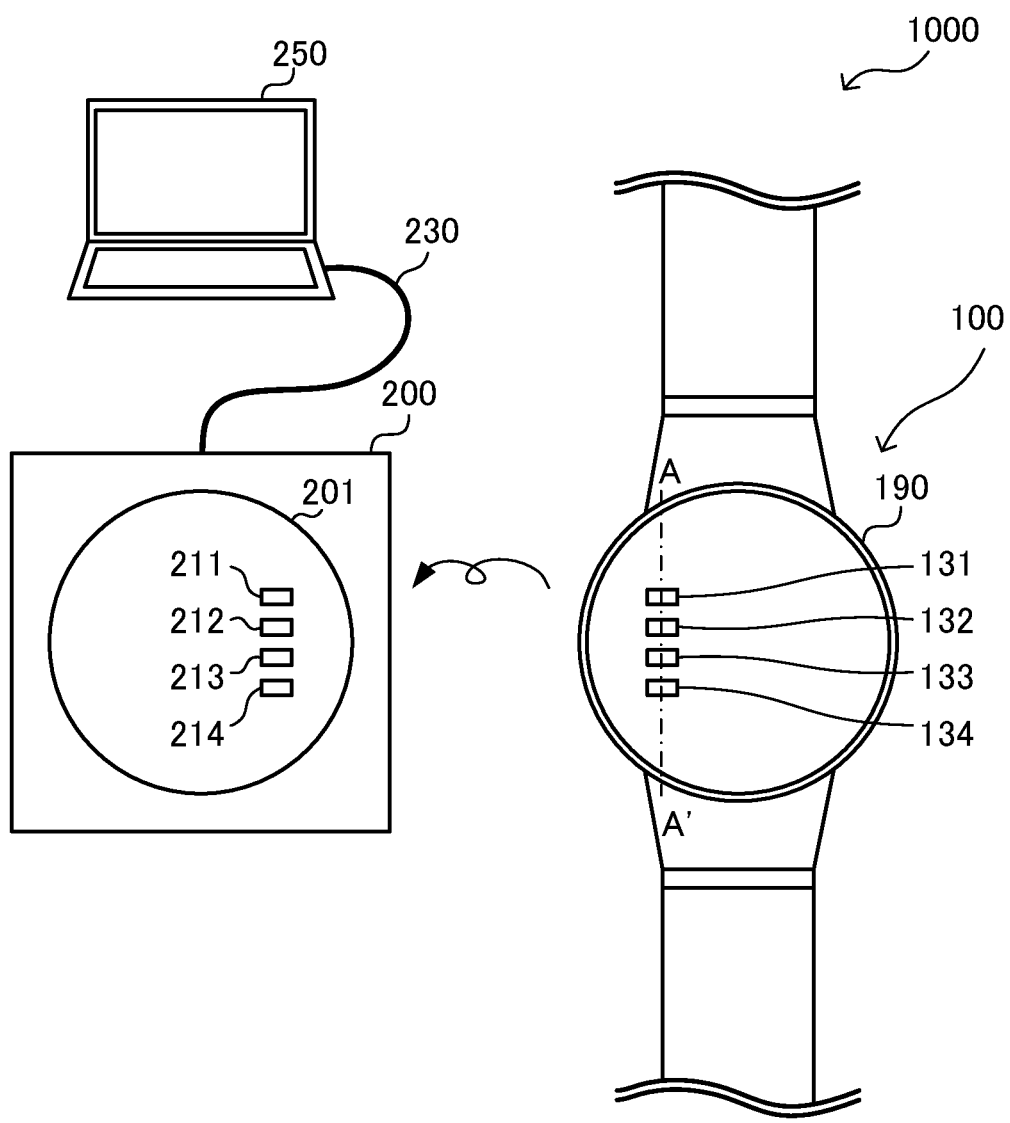
FIG. 1 is a drawing explaining an overview of a removable system according to Embodiment 1.

Hereinafter, a wearable device according to various embodiments is described while referencing the drawings. Note that, in the drawings, identical or corresponding components are denoted with the same reference numerals.

Embodiment 1

In the following, to facilitate comprehension, an example is described of a case in which a wearable device 100 according to Embodiment 1 is applied to a removable system 1000 illustrated in FIG. 1. In this example, the removable system 1000 includes the wearable device 100, and a charger device 200 connected to a personal computer (PC) 250 via a universal serial bus (USB) cable 230.

As illustrated in FIG. 1, the wearable device 100 according to Embodiment 1 is a wristwatch-type device that includes a main body 190, and USB terminals 131, 132, 133, 134 on a back side of the main body 190. When the main body 190 of the wearable device 100 is set on a charging frame 201 of the charger device 200, the terminals 131, 132, 133, 134 respectively contact terminals 211, 212, 213, 214 of the charger device 200 and, as a result, the wearable device 100 is charged. The charger device 200 is connected to the PC 250 via the USB cable 230, and receives a supply of charging power from the PC 250. Additionally, data communication between the wearable device 100 and the PC 250 can be carried out by going through the charger device 200. Note that the charger device 200 does not necessarily have to be connected to the PC 250 and, for example, may be connected to a USB port of a power strip via the USB cable 230 to receive the supply of charging power.

USB Type-A is used as the USB ports of PCs and power strips and has four terminals according to standards. With the wearable device 100, as illustrated in FIG. 1, the four terminals are arranged on the back side of the main body 190 in the order of a D+ terminal 131 that is a positive data transfer terminal, a VBUS terminal 132 to which 5V of voltage is supplied, a GND terminal 133 that defines 0V, which is the reference of the voltage, and a D− terminal 134 that is a negative data transfer terminal.

Note that, the order of typical USB Type-A terminals is, from the end, the VBUS terminal, the D− terminal, the D+ terminal, and the GND terminal. With the wearable device 100, the data transfer terminals (the D+ terminal and the D− terminal) are arranged at either end so as to use terminals used for worn/removed determination also as the data transmission terminals. As illustrated in FIG. 1, the charger device 200 also includes, in correspondence with the wearable device 100, a D+ terminal 211, a VBUS terminal 212, a GND terminal 213, and a D− terminal 214, in this order. Note that, since the 5V of voltage is applied to the VBUS terminal at a time of charging, it is desirable that, for the sake of safety, the VBUS terminal is not used for any other uses. The GND terminal is the terminal that determines the reference of the voltage and, as such, it is desirable that the ground terminal is only connected to a GND to ensure the stable operation of the device. Therefore, in the present embodiment, the data transmission terminals are configured as the terminals that are also used for worn/removed determination.

Figure 2:
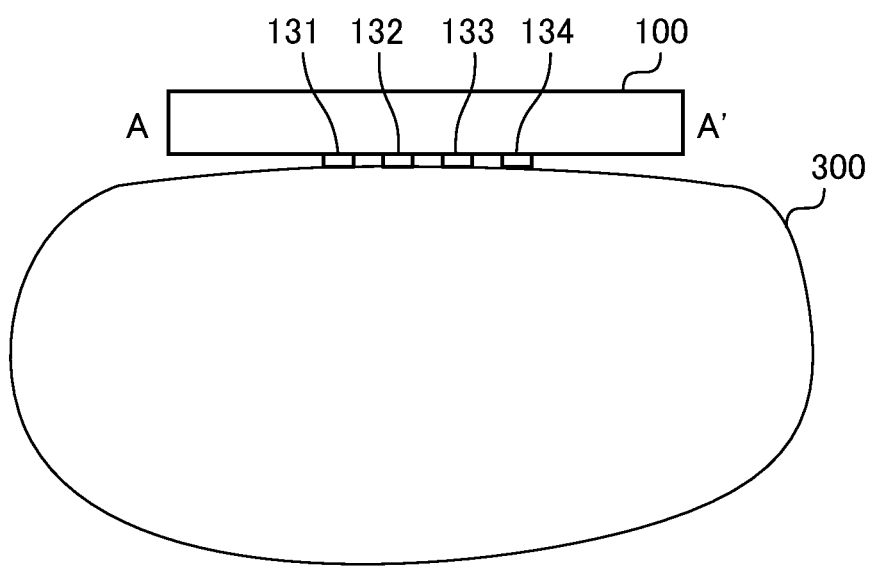
FIG. 2 is a cross-sectional drawing of a wearable device according to Embodiment 1.

When a user wears the wearable device 100 on an arm 300, the terminals 131, 132, 133, 134 contact the arm 300 as illustrated in FIG. 2. Note that FIG. 2 is a cross-section of the wearable device 100 taken along the dot-dash line A-A' of FIG. 1, in a case in which the wearable device 100 is worn on the arm 300.

Figure 3:
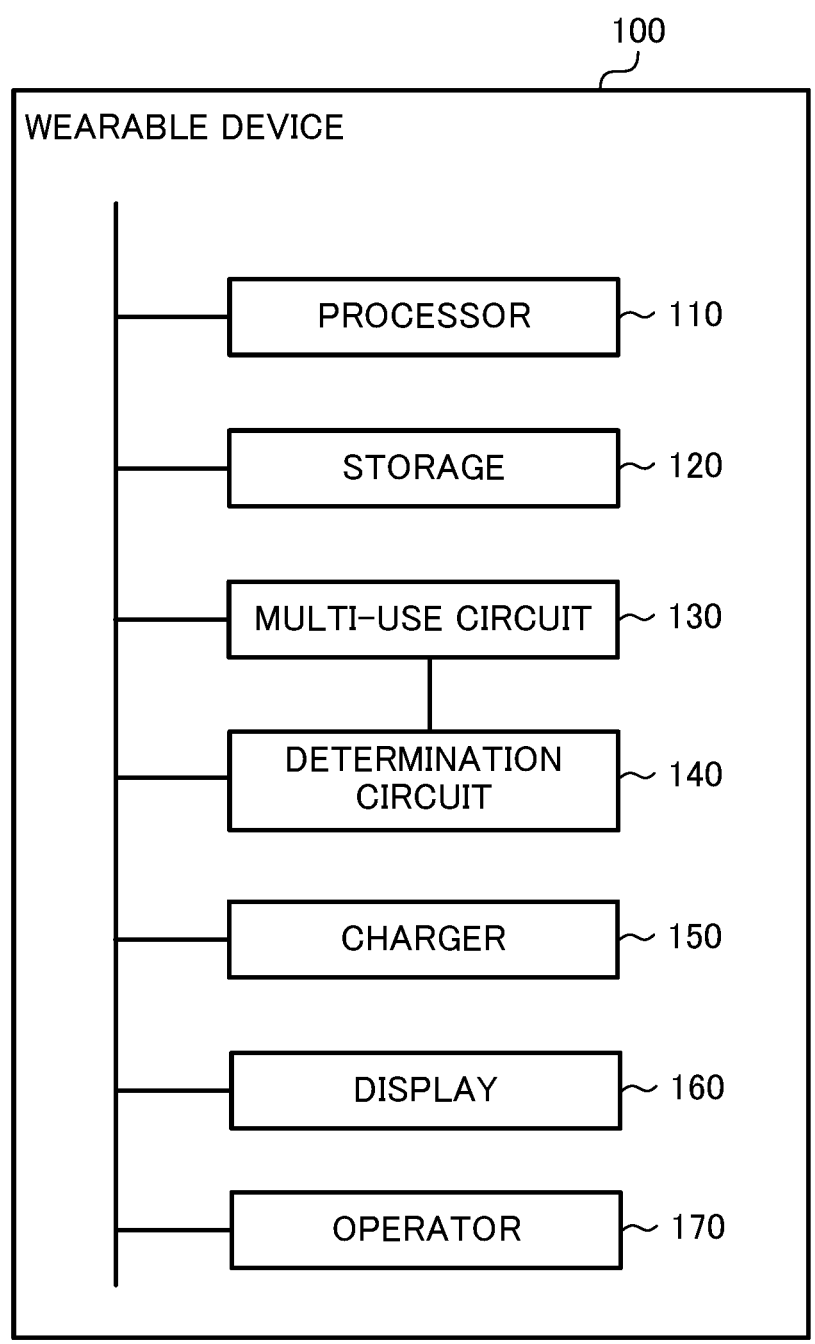
FIG. 3 is a block diagram illustrating the functional configuration of the wearable device according to Embodiment 1.

As illustrated in FIG. 3, the wearable device 100 according to Embodiment 1 includes, as the functional configuration thereof, a processor 110, a storage 120, a multi-use circuit 130, a determination circuit 140, a charger 150, a display 160, and an operator 170.

In one example, the processor 110 is configured from a micro-controller including a central processing unit (CPU) or similar processor, a memory, and the like. The processor 110 executes, by a program stored in the storage 120, worn/removed determination processing (described later), and processing for demonstrating the other features of the wearable device 100. Note that the processor 110 is compatible with multithreading functionality, in which a plurality of processes are executed in parallel. Additionally, the processor 110 is provided with a function that counts time using a real time clock (RTC) or the like.

Figure 4:
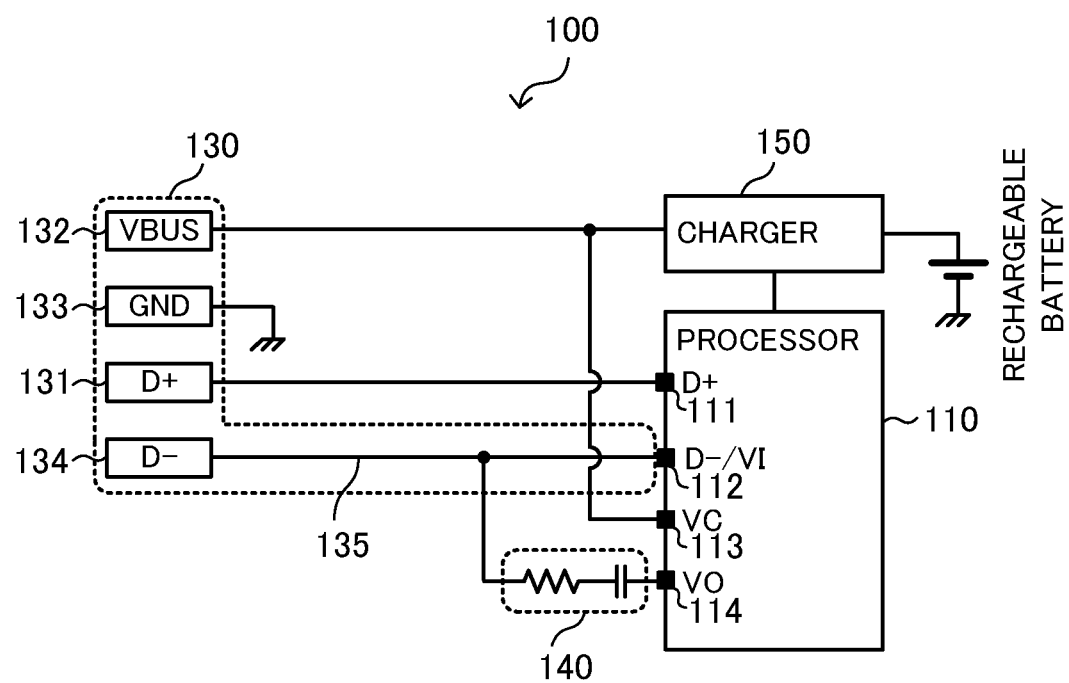
FIG. 4 is a drawing explaining the connection relationships between a processor, a multi-use circuit, and a determination circuit of the wearable device according to Embodiment 1.

As illustrated in FIG. 4, the processor 110 includes a plurality of input/output ports 111, 112, 113, 114. The input/output ports 111, 112 are respectively assigned to the D+ and D− input/output ports of the USB. The input/output port 113 is assigned to a VC input port that determines if voltage is being applied to the VBUS terminal (if the wearable device 100 is set on the charger device 200).

The input/output port 114 is assigned to a VO output port that applies rectangular wave voltage to the multi-use circuit 130 through the determination circuit 140. The input/output port 114 (the VO port) is set to have high impedance when not applying the rectangular voltage or the like. Note that the input/output port 112 (the D− input/output port) is also used as a VI input port that detects the waveform of the voltage applied, by the VO output port, to a connection wire 135 of the multi-use circuit 130.

The storage 120 stores programs to be executed by the processor 110 and necessary data. The storage 120 may include random access memory (RAM), read-only memory (ROM), flash memory, or the like, but is not limited thereto. Note that the storage 120 may be provided inside the processor 110.

As illustrated in FIG. 4, the multi-use circuit 130 includes the four terminals of the USB (the D+ terminal 131, the VBUS terminal 132, the GND terminal 133, and the D− terminal 134), and a connection wire 135 that connects the D− terminal 134 of the USB to the input/output port 112 (the D− input/output port of the USB) of the processor 110. The D+ terminal 131 and the D− terminal 134 of the multi-use circuit 130 are terminals of the USB that are used for data transfer, and are respectively connected to the input/output port 111 (the D+ input/output port of the USB) and the input/output port 112 (the D− input/output port of the USB) of the processor 110. The VBUS terminal 132 is the terminal of the USB to which +5V of power is supplied, and is connected to the charger 150. The GND terminal 133 is the ground terminal of the USB that serves as the reference of the voltage, and is connected to the GND. Thus, the multi-use circuit 130 can be used to execute a charging function and a data transfer function of the USB. In the present embodiment, the D− terminal 134 of the USB of the multi-use circuit 130 is a terminal that is also used for the worn/removed determination (hereinafter referred to as "determination terminal") and, as described later, the multi-use circuit 130 can be used to execute the worn/removed determination function by cooperating with the determination circuit 140.

As illustrated in FIG. 4, the determination circuit 140 includes a capacitor and a resistor. The ends of the determination circuit 140 are respectively connected to the connection wire 135 and the input/output port 114 (the VO output port) of the processor 110. Due to this circuit configuration, the voltage waveform detected at the input/output port 112 (the VI input port) in a state in which the rectangular voltage is being applied to the connection wire 135 of the multi-use circuit 130 from the input/output port 114 of the processor 110 changes between when the determination terminal (the D− terminal 134) of the multi-use circuit 130 is in contact and is not in contact with the human body. Accordingly, the processor 110 can make a worn/removed determination of the wearable device 100 by confirming the voltage waveform using the multi-use circuit 130 and the determination circuit 140.

As illustrated in FIG. 4, the charger 150 charges a rechargeable battery of the wearable device 100 using power from the VBUS terminal 132 of the multi-use circuit 130.

The display 160 includes a liquid crystal display, an organic electro-luminescence (EL) display, or the like, and displays the current time or the like.

The operator 170 is a user interface such as a push button switch or the like, and receives operations/inputs from the user.

Figure 5:
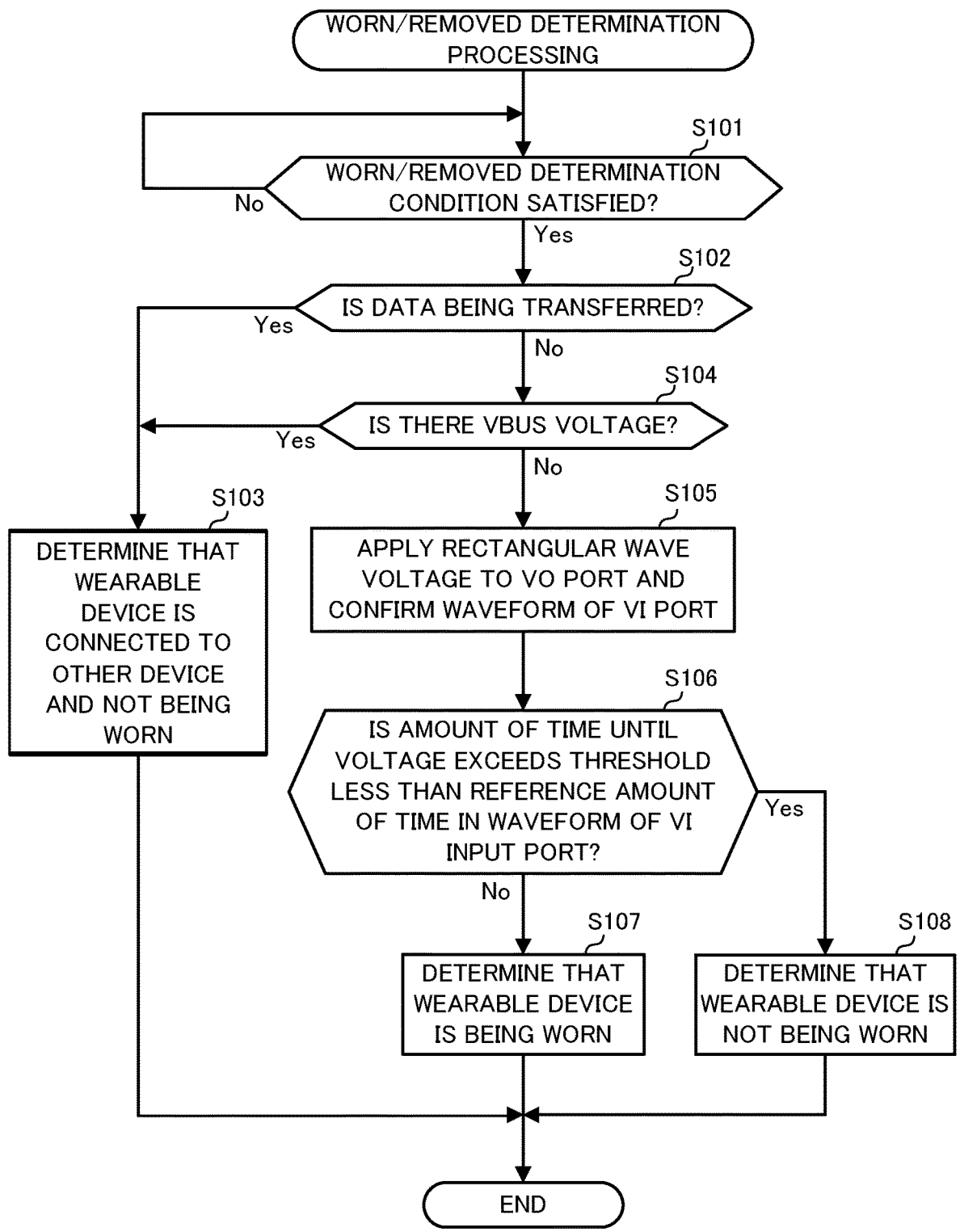
FIG. 5 is a flowchart of worn/removed determination processing according to Embodiment 1.

Next, worn/removed determination processing executed by the processor 110 is described while referencing FIG. 5. The wearable device 100 starts the worn/removed determination processing automatically when the power is turned ON or on the basis of an operation of the user (for example, the worn/removed determination processing is started when the user desires to perform a worn/removed determination).

Firstly, the processor 110 determines if a worn/removed determination condition is satisfied (step S101). Any condition can be set for the worn/removed determination condition. Examples thereof include conditions such as, "the operator 170 has not received an operation from the user for a predetermined amount of time (for example, one hour) (that is, there have been no user operations for the predetermined amount of time)", "the current time is a scheduled wearing detection time", or, when the wearable device 100 includes an acceleration sensor (not illustrated in the drawings), "a detection value of the acceleration sensor is constant for a predetermined amount of time (for example, one hour) (that is, the wearable device 100 has been stationary for the predetermined amount of time)", and the like. Note that, the scheduled wearing detection time is a time set as a time at which to determine whether the wearable device 100 is being worn. For example, in a case in which it is desirable to perform the worn/removed determination frequently in order to enhance security, the scheduled wearing detection time may be set to the current time+α amount of time (where α amount of time is one minute, for example), and the worn/removed determination is performed every α amount of time. Moreover, a configuration is possible in which the worn/removed determination processing is repeatedly executed while an "is wearing" worn/removed determination is made in the worn/removed determination processing. Additionally, when power saving is to be prioritized over security, the scheduled wearing detection time may be set to "noon every day", for example, to lower the frequency of the worn/removed determination.

When the worn/removed determination condition is not satisfied (step S101; No), the processor 110 returns to step S101 and repeats step S101 until the worn/removed determination condition is satisfied.

When the worn/removed determination condition is satisfied (step S101; Yes), the processor 110 determines whether USB data transfer is being performed by the multi-use circuit 130 (step S102). When USB data transfer is being performed (step S102; Yes), the processor 110 makes a worn/removed determination that "the wearable device 100 is connected to the PC, the charger device 200, or another device, and is not being worn on the arm 300" (step S103), and ends the worn/removed determination processing.

When USB data transfer is not being performed (step S102; No), the processor 110 confirms the VC input port (the input/output port 113), and determines if the +5V of voltage of the VBUS is being applied to the VC input port (step S104). When the voltage of the VBUS is confirmed at the VC input port (step S104; Yes), the processor 110 executes the processing of step S103. As a result of executing steps S102 and S104, a determination is made as to whether the terminals (including the determination terminal) of the USB that are the multi-use circuit 130 are connected to the PC, the charger device 200, or another device (another device other than the wearing target and the wearable device 100). Specifically, when a confirmation is made that data transfer is being performed or voltage of the VBUS is being applied, the processor 110 determines that "the determination terminal of the multi-use circuit 130 is connected to another device."

Note that, when the wearable device 100 is being worn on the arm 300, voltage may be applied to the VC input port due to static electricity charged on the arm 300. In order to prevent erroneous determinations caused by this static electricity, the processor 110 may be configured to confirm the voltage being applied to the VC input port in step S104 a plurality of times. For example, the processor 110 may confirm the voltage being applied to the VC port a plurality of times (for example, two times) at one millisecond intervals. Then, when the absolute value of the difference between the confirmed plurality of voltages (the amount of fluctuation of the voltage) is less than or equal to a predetermined reference amount of fluctuation (for example, 0.5V) and, also, each of the confirmed plurality of voltages is greater than or equal to a predetermined reference voltage (a voltage slightly lower than the +5V voltage of the VBUS such as, for example +4.5V), a determination is made that the stable +5V voltage of the VBUS, and not unstable voltage such as static electricity, is being applied and, as such, the processor 110 determines that "the determination terminal of the multi-use circuit 130 is connected to another device."

When the voltage of the VBUS is not confirmed at the VC input port (step S104; No), the processor 110 determines that "the determination terminal of the multi-use circuit 130 is not connected to another device", applies rectangular wave voltage having an amplitude Va (rectangular wave voltage in which a minimum voltage 0 and a maximum voltage Va repeat every predetermined amount of time) to the VO output port (the input/output port 114), and confirms the waveform of the voltage detected at the VI input port (the input/output port 112) (step S105). This rectangular wave voltage is also called "worn/removed determination voltage." In step S105, when the processor 110 applies the rectangular wave voltage to the VO output port (the input/output port 114), the rectangular wave voltage is applied to the D− terminal 134 via the VO output port and the connection wire 135. This corresponds to applying a predetermined worn/removed determination voltage to the terminal (the D− terminal 134 that is the determination terminal) of the multi-use circuit 130. The voltage detected at the VI input port (the input/output port 112) in a state in which the processor 110 is applying the rectangular wave voltage to the VO output port (the input/output port 114) (a state in which the rectangular wave voltage is being applied to the D− terminal 134) corresponds to the voltage from the determination terminal in a state in which the worn/removed determination voltage is being applied to the terminal (the D− terminal 134 that is the determination terminal). Note that the voltage detected at the VI input port (the input/output port 112) is equivalent to each of the voltage detected at the connection wire 135 and the voltage detected at the D− terminal 134. Accordingly, a configuration is possible in which, instead of the voltage detected at the VI input port, voltage detected by a voltmeter directly connected to the D− terminal 134, for example, is used to perform the worn/removed determination.

Then, the processor 110 determines whether, in the waveform of the voltage detected at the VI input port, the amount of time until the voltage exceeds a threshold Vt from 0 is less than a reference amount of time T (step S106). The value of the threshold Vt is set as a value that is slightly less than the amplitude Va of the rectangular wave output to the VO output port in step S105 (for example, Vt=0.7×Va, or the like). Additionally, the value of the reference amount of time T is set as an amount of time that is slightly longer than an amount of time Tt until the voltage, detected at the VI input port in a case in which the rectangular wave voltage is applied when the wearable device 100 is not worn on the arm 300, exceeds the threshold Vt from 0 (for example, T=1.1×Tt, or the like). The reference amount of time T may be set on the basis of design data when designing the wearable device 100, or may be set on the basis of measured values obtained by actually applying the rectangular wave voltage when factory shipping the wearable device 100 or the like. The value of the threshold Vt and the value of the reference amount of time T are each stored in advance in the storage 120.

When the determination terminal of the multi-use circuit 130 is in contact with the arm 300, the voltage applied to the VO output port transmits to the arm 300 and, as such, the amount of time for the voltage detected at the VI input port to exceed Vt increases. Accordingly, the processor 110 can perform the worn/removed determination on the basis of the voltage waveform detected at the VI input port. The processor 110 confirms the waveform of the voltage detected at the VI input port when the rectangular wave voltage is applied to the connection wire 135 connected to the determination terminal of the multi-use circuit 130 via the determination circuit 140. Therefore, the determination of step S106 can be said to be a worn/removed determination that is performed by cooperation between the multi-use circuit 130 (the determination terminal) and the determination circuit 140. Moreover, in step S106, the processor 110 compares the voltage detected at the VI input port with the threshold Vt to perform the worn/removed determination. However, since the threshold Vt is a value determined on the basis of the worn/removed determination voltage Va (for example Vt=0.7×Va), this worn/removed determination can be said to be a worn/removed determination that is performed on the basis of the relationship between the voltage (voltage from the determination terminal) detected at the VI input port (the input/output port 112) and the worn/removed determination voltage. Note that, in the present embodiment, the rectangular wave voltage is applied to the VO output port as the worn/removed determination voltage, but the worn/removed determination voltage to be applied is not limited to the rectangular wave voltage. For example, a constant voltage Va can be applied as the worn/removed determination voltage to perform the worn/removed determination.

When, in the waveform detected at the VI input port, the amount of time for the voltage to exceed the threshold Vt from 0 is greater than or equal to the reference amount of time (step S106; No), the processor 110 makes a worn/removed determination that "the wearable device 100 is being worn on the arm 300" (step S107), and ends the worn/removed determination processing.

When, in the waveform detected at the VI input port, the amount of time for the voltage to exceed the threshold Vt from 0 is less than the reference amount of time (step S106; Yes), the processor 110 makes a worn/removed determination that "the wearable device 100 is not being worn on the arm 300" (step S108), and ends the worn/removed determination processing.

Note that a configuration is possible in which the worn/removed determination processing is repeatedly executed/started after the end of the worn/removed determination processing in order to continuously determine that the wearable device 100 is removed from the wearing target such as the arm 300. Moreover, a configuration is possible in which, when a worn/removed determination is made even one time that "the wearable device 100 is not being worn on the arm 300", after that determination, the processor 110 requests that the user input a password on the wearable device 100 before performing processing for which higher security is desired (for example, electronic payment processing).

The worn/removed determination processing is described above. As a result of the worn/removed determination processing, the wearable device 100 can use the terminals of the USB also for the worn/removed determination, without being provided with a dedicated component for worn/removed determination.

With the pulse measuring instrument described in Unexamined Japanese Patent Application Publication No. 2016-129526, a determination is made as to whether the pulse measuring device is being worn on the arm of user by a wearing sensor that has four metal pins protruding from the bottom surface of the main body of the device. Thus, in conventional wearable devices, a dedicated component (for example, the four metal pins described above) for worn/removed determination must be provided to determine if the device is being worn or is removed, and this is an obstacle from the perspectives of cost reduction, miniaturization, mounting area, and the like.

With the wearable device 100 described above, the processor 110 uses the VC input port to determine if voltage is being applied to the VBUS terminal (if the wearable device 100 is set on the charger device 200). However, a configuration is possible in which the processor 110 acquires, from the charger 150, information about whether voltage is being applied to the VBUS terminal and, in such a case, the processor 110 need not be provided with the VC input port.

By using the terminals of the USB as the multi-use circuit 130, the wearable device 100 can reliably determine whether the multi-use circuit 130 is connected to another device by confirming the voltage being applied to the VBUS terminal 132 of the USB. Furthermore, compared to when using the power supply terminal or the like as the determination terminal of the multi-use circuit 130 that is the connection target of the connection wire 135 connected to the determination circuit 140 (the terminal connected to the VI input port), using the data transfer terminal of the USB to perform the worn/removed determination enables the worn/removed determination to be performed with greater safety. However, the determination terminal of the multi-use circuit 130 is not limited to the data transfer terminal, and a configuration is possible in which the VBUS terminal 132 or the GND terminal 133 is used as the determination terminal.

Embodiment 2

In Embodiment 1, the determination circuit 140 is constantly connected to the connection wire 135 of the multi-use circuit 130. The input/output port 114 (the VO output port), that is the connection target of the other end of the determination circuit 140, is configured to have high impedance and not obstruct the USB data transfer while not applying the rectangular wave voltage. However, the input/output port 114 may obstruct the USB data transfer when some sort of malfunction occurs and the input/output port 114 does not have high impedance. As such, in Embodiment 2, in order to more reliably eliminate the possibility of obstructions to the USB data transfer, a switch is provided that switches whether the determination circuit 140 and the multi-use circuit 130 are connected.

Figure 7:
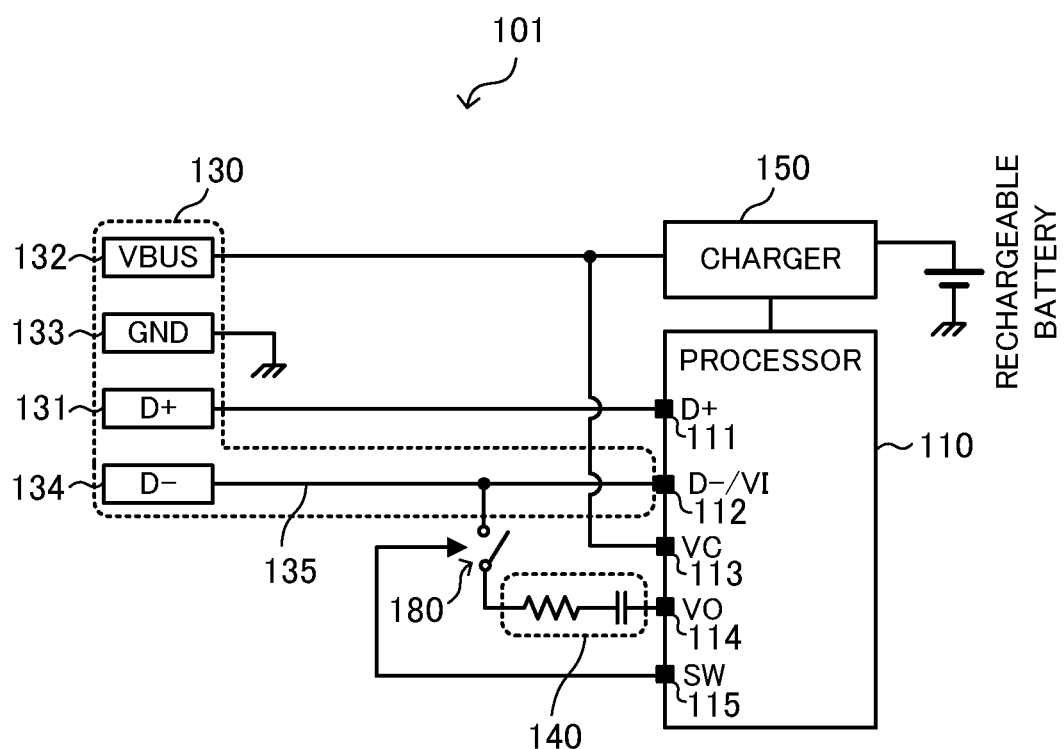
FIG. 7 is a drawing explaining the connection relationships between a processor, a multi-use circuit, a determination circuit, and a switcher of the wearable device according to Embodiment 2.

As illustrated in FIG. 7, a wearable device 101 according to Embodiment 2 has the functional configuration of the wearable device 100 according to Embodiment 1, with the addition of a switcher 180.

As illustrated in FIG. 7, the switcher 180 includes a switch that switches whether the connection wire 135 of the multi-use circuit 130 and the determination circuit 140 are connected. Additionally, as illustrated in FIG. 7, the processor 110 of the wearable device 101 includes, as an input/output port 115, a SW output port that controls the switch of the switcher 180.

Figure 8:
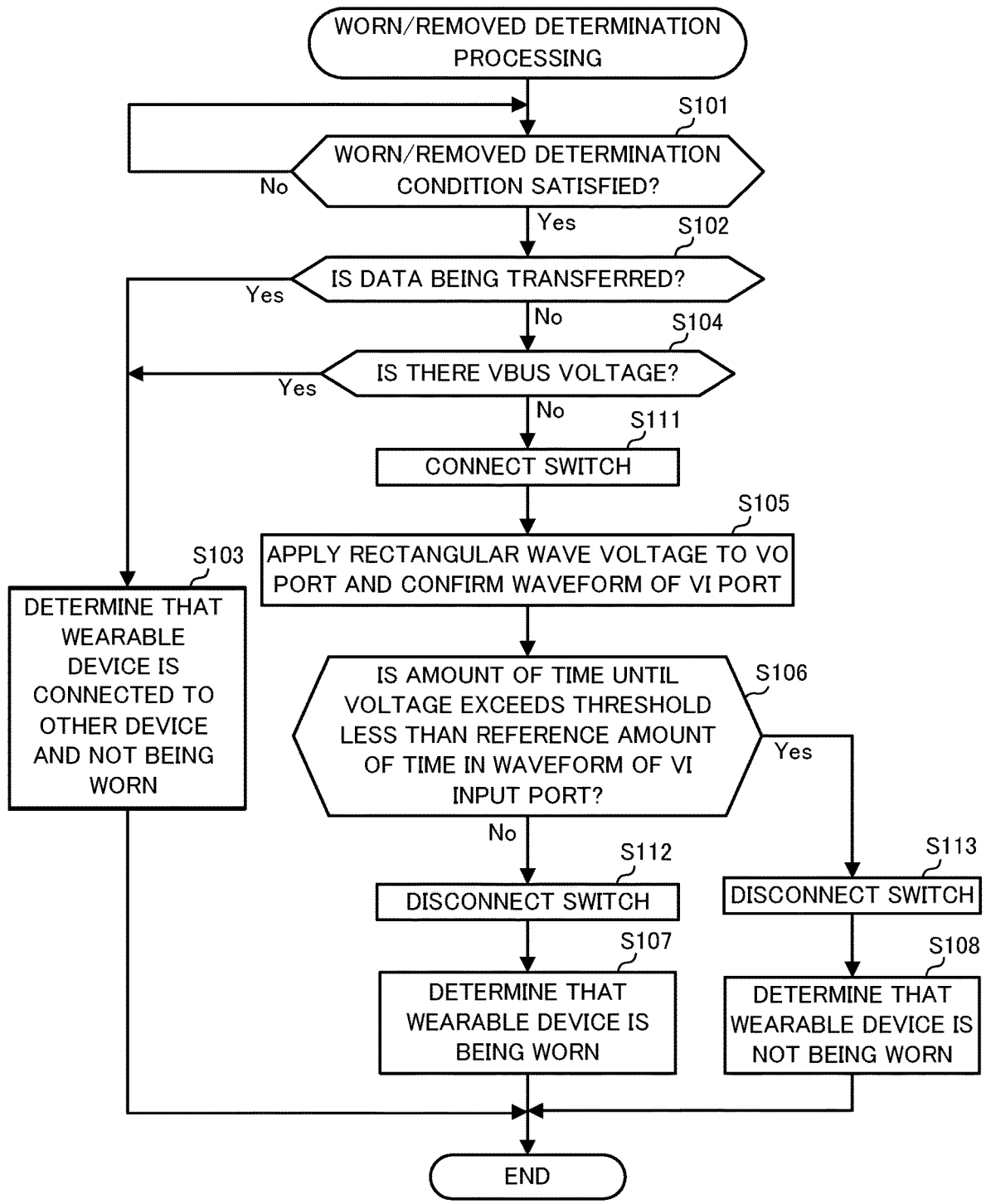
FIG. 8 is a flowchart of worn/removed determination processing according to Embodiment 2.

Next, worn/removed determination processing according to Embodiment 2 is described while referencing FIG. 8. This processing includes, in addition to the worn/removed determination processing according to Embodiment 1 described while referencing FIG. 5, a step S111 between steps S104 and S105, a step S112 between steps S106 and S107, and a step S113 between steps S106 and S108. The following description focuses on the processing of the added steps.

In step S111, the processor 110 controls the SW output port to connect the switch of the switcher 180. As a result, the determination circuit 140 is connected to the connection wire 135 of the multi-use circuit 130. In steps S112 and S113, the processor 110 controls the SW output port to disconnect the switch of the switcher 180. As a result, the determination circuit 140 is disconnected from the connection wire 135 of the multi-use circuit 130.

Aside from the content described above, the wearable device 101 is the same as the wearable device 100, and the wearable device 101 can use the terminals of the USB for the worn/removed determination, without being provided with a dedicated component for the worn/removed determination. Additionally, the switcher 180 can switch whether the connection wire 135 of the multi-use circuit 130 and the determination circuit 140 are connected and, as such, the determination circuit 140 can be reliably prevented from obstructing the USB data transfer.

Embodiment 3

Figure 9:
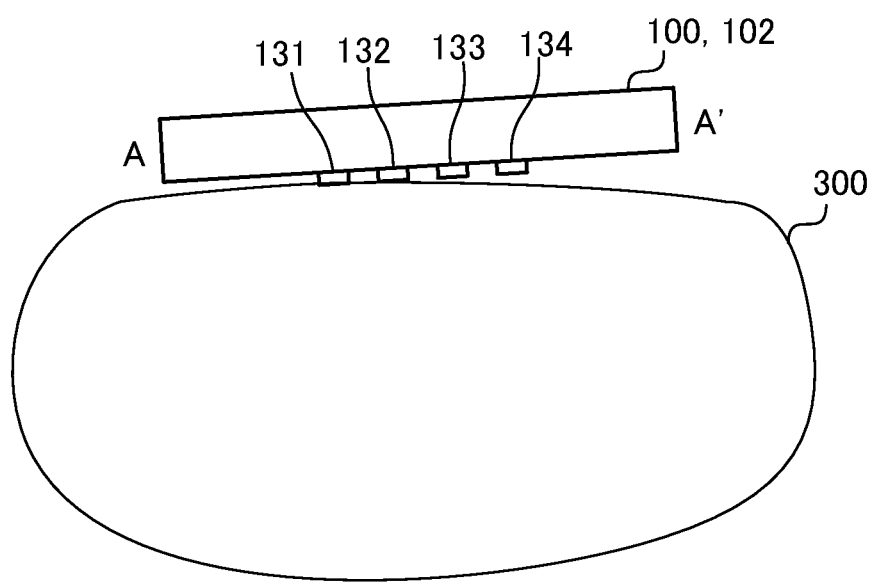
FIG. 9 is a drawing explaining a case in which the wearable device is diagonally contacting an arm.

In the embodiments described above, only the D− terminal 134 of the multi-use circuit 130 is used as the determination terminal for performing the worn/removed determination of the wearable device 100, 101. Typically, there are no problems with such a configuration but, when the wearable device 100 is worn in an inclined manner such as illustrated in FIG. 9, the D− terminal 134 floats and does not contact the arm 300. Consequently, in a state such as in FIG. 9, the wearable device 100 is determined as not being worn. When the wearable device 100 is worn in an inclined manner, it is also possible that the D+ terminal 131 will float and not contact the arm 300.

Thus, in Embodiment 3, a description is given in which worn/removed determination can be correctly performed even when the wearable device 100 is worn in an inclined state.

Figure 6:
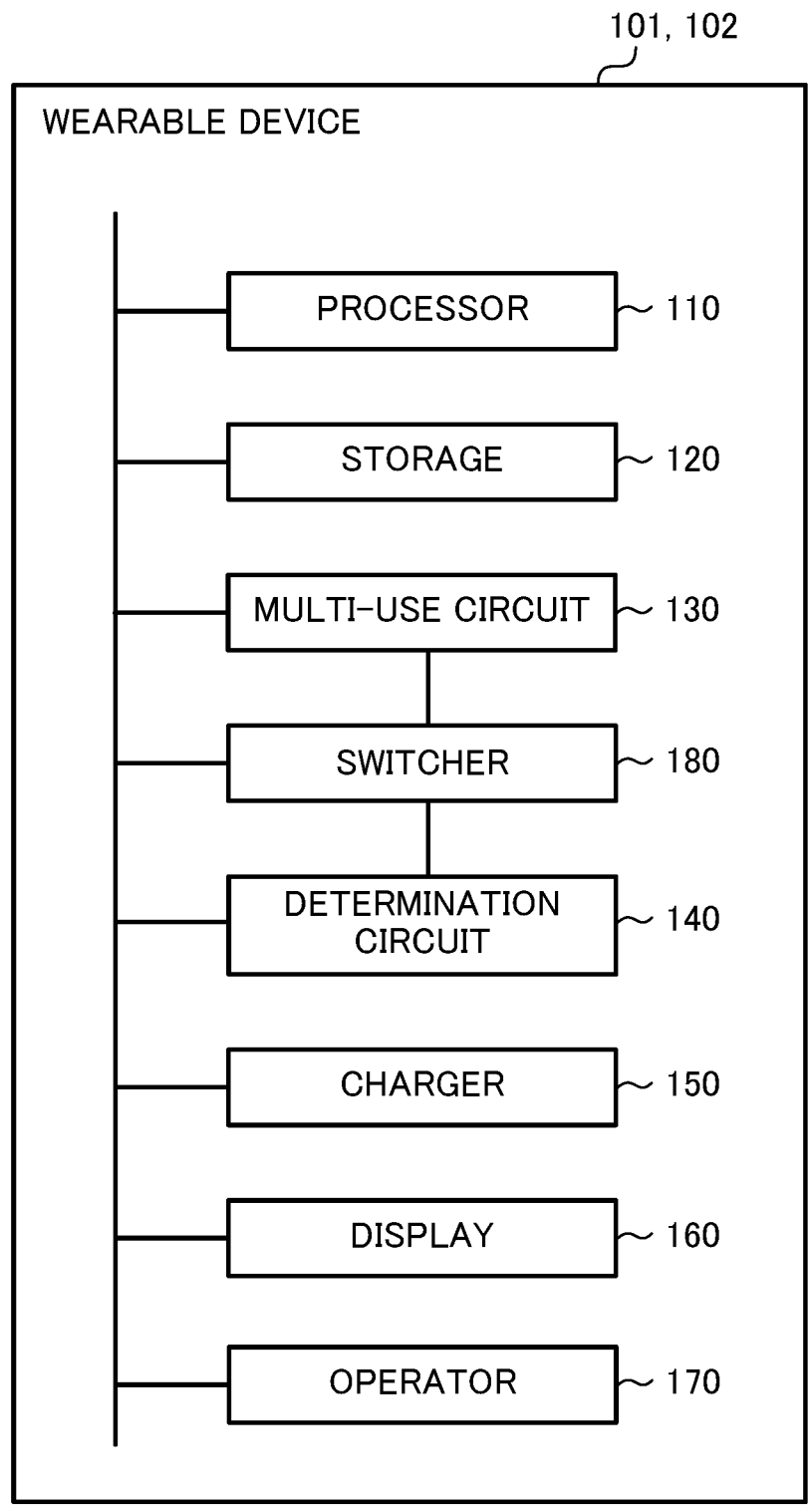
FIG. 6 is a block diagram illustrating the functional configuration of the wearable device according to Embodiment 2.

The functional configuration of a wearable device 102 according to Embodiment 3 is the same as the wearable device 101 according to Embodiment 2, and is illustrated in FIG. 6.

Figure 10:
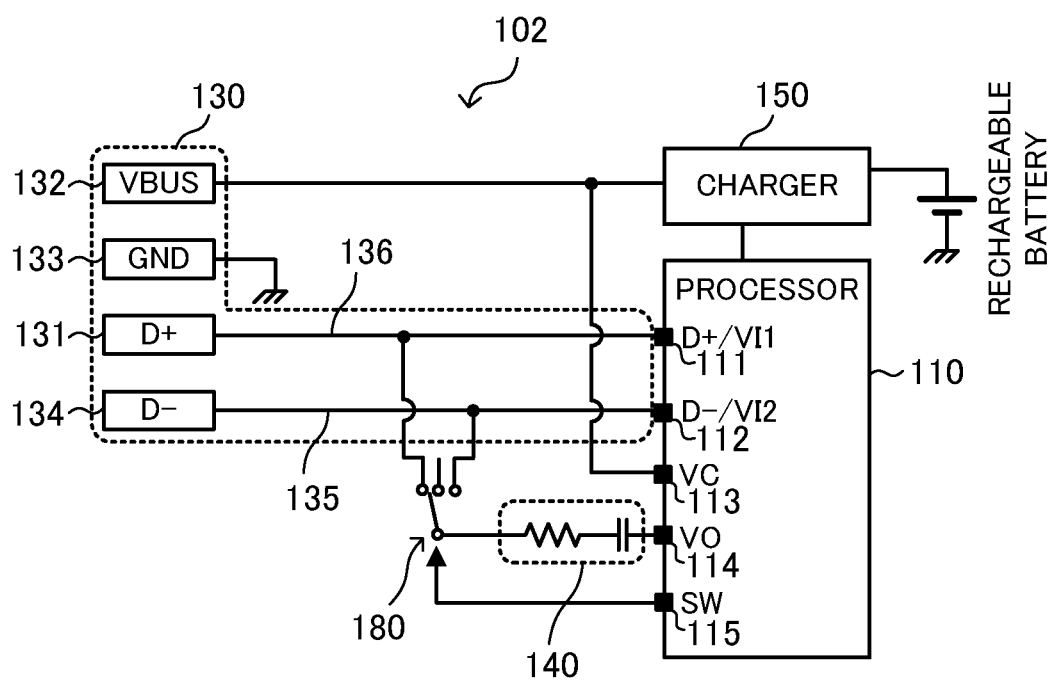
FIG. 10 is a drawing explaining the connection relationships between a processor, a multi-use circuit, a determination circuit, and a switcher of a wearable device according to Embodiment 3.

However, as illustrated in FIG. 10, in addition to the four terminals of the USB (the D+ terminal 131, the VBUS terminal 132, the GND terminal 133, and the D− terminal 134) and the connection wire 135, the multi-use circuit 130 according to Embodiment 3 includes a connection wire 136 that connects the D+ terminal 131 of the USB and the input/output port 111 (the D+ input/output port of the USB) of the processor 110. Moreover, the D+ terminal 131 and the D− terminal 134 are used as determination terminals of the multi-use circuit 130.

As illustrated in FIG. 10, the switcher 180 according to Embodiment 3 includes a switch that switches whether the determination circuit 140 is not connected to anything, is connected to the connection wire 135 of the multi-use circuit 130, or is connected to the connection wire 136 of the multi-use circuit 130. Moreover, as illustrated in FIG. 10, the input/output port 115 (the SW output port) of the processor 110 of the wearable device 102 controls the switch of the switcher 180.

The input/output port 111 (the D+ input/output port) of the processor 110 according to Embodiment 3 is also used as a first VI input port (VI1 input port) that detects the waveform of a signal output to the connection wire 136 of the multi-use circuit 130 by the input/output port 114 (the VO output port), and the input/output port 112 (the D− input/output port) is also used as a second VI input port (VI2 input port) that detects the waveform of a signal output to the connection wire 135 of the multi-use circuit 130 by the input/output port 114 (the VO output port).

Note that it is not necessary to limit the number of VI input ports that detect the waveforms of the signals output to the multi-use circuit 130 by the input/output port 114 (the VO output port) to two. For example, a configuration is possible in which the input/output port 113 (the VC input port) connected to the VBUS terminal 132 of the multi-use circuit 130 is set as a third VI input port, and a configuration is possible in which another input/output port of the processor 110 connects to the GND terminal 133 of the multi-use circuit 130 and is set as a fourth VI input port. Additionally, a configuration is possible in which a terminal, other than the terminals of the USB, that a human body may come in contact with when wearing is also used as a determination terminal of the multi-use circuit 130. In such a case, it is sufficient that this terminal is connected to another input/output port of the processor 110, and that input/output port is set as the third or later VI input port.

Next, worn/removed determination processing according to Embodiment 3 is described while referencing FIG. 11. This processing additionally includes steps S121 and S122 in place of step S111 of the worn/removed determination processing according to Embodiment 2 described while referencing FIG. 8, an additional step S123 between steps S106 and S113, and processing for returning to step S105 after step S124 when the determination in step S123 is No. The following description focuses on the processing of the added steps.

In step S121, the processor 110 acquires the number of VI input ports and switch switching information. Specifically, the processor 110 acquires "2", which is the number of VI input ports of the processor 110 according to Embodiment 3. Moreover, the processor 110 acquires information about how to control the SW output port of the processor 110 when connecting the switch of the switcher 180 to the connection wire connected to the nth VI input port, and when not connecting the switch of the switcher 180 to anything. Thus, the processor 110 can acquire the number of VI input ports and the switch switching information in step S121 and, as such, this worn/removed determination processing can perform the worn/removed determination using all of the VI input ports even when the number of VI input ports is greater than 2.

In step S122, the processor 110 switches the switch of the switcher 180 on the basis of the information acquired in step S121, such that the connection wire connected to the first VI input port and the determination circuit 140 are connected.

In step S123, the processor 110 determines, on the basis of the information acquired in step S121, whether the switch of the switcher 180 has been switched to all of the VI input ports. When the switch has been switched to all of the VI input ports (step S123; Yes), step S113 is executed.

When the switch has not been switched to all of the VI input ports (step S123; No), the processor 110 switches the switch of the switcher 180 on the basis of the information acquired in step S121, such that the connection wire connected to the next VI input port and the determination circuit 140 are connected (step S124), and executes step S105.

Note that, in step S112 and step S113, the processor 110 switches the switch of the switcher 180 on the basis of the information acquired in step S121, such that the determination circuit 140 is not connected to any of the VI input ports. As a result, the determination circuit 140 is disconnected from the various connection wires 135 and 136 of the multi-use circuit 130.

Aside from the content described above, the wearable device 102 is the same as the wearable device 101 and can use the terminals of the USB for the worn/removed determination without being providing with a dedicated component for worn/removed determination. Additionally, due to the switcher 180, the determination circuit 140 can be reliably prevented from obstructing the USB data transfer. Furthermore, even when the wearable device 102 is being worn inclined as illustrated in FIG. 9, whether the wearable device 102 is being worn on the arm 300 can be reliably determined.

In the embodiments described above, the determination terminal of the multi-use circuit 130 is a terminal of the USB (for example, the D− terminal 134). However, the determination terminal is not limited to the terminals of the USB. Any terminal that contacts the human body when the wearable device is worn can be used as the determination terminal. For example, in a case in which a communication terminal or a charging terminal other than the terminals of the USB contacts the human body when the wearable device is worn, that terminal can be used as the determination terminal of the multi-use circuit 130.

In such a case, a configuration is provided in which the connection wires from the terminals used as determination terminals are connected to the VI input ports of the processor 110. Moreover, when the terminals are not connected to another device (the PC, the charger device 200, or the like), the processor 110 uses the switcher 180 to connect the terminals to the VO output port of the processor 110 via the determination circuit 140, and applies the rectangular wave voltage. In this state, the processor 110 can determine whether the wearable device is being worn on the arm 300 by confirming the waveforms of the signals detected at the VI input ports.

In the embodiments described above, the determination circuit 140 is a circuit that includes a capacitor and a resistor. However, the configuration of the determination circuit 140 is not limited thereto.

For example, a configuration is possible in which the determination circuit 140 includes a touch sensor integrated circuit (IC) that is used when forming a touch sensor. The touch sensor IC (or a circuit board provided with the touch sensor IC) includes a terminal that connects a metal pad for detecting a touch. The determination terminal (for example, the D− terminal 134) of the multi-use circuit 130 connects to this terminal. Thus, the processor 110 can use the touch sensor IC to determine whether the human body is in contact with the determination terminal of the multi-use circuit 130.

In such a case, when the processor 110 determines, by the touch sensor IC, that the arm 300 is in contact with the determination terminal of the multi-use circuit 130, the processor 110 makes a worn/removed determination that "the wearable device 100, 101, 102 is being worn on the arm 300." Moreover, when the processor 110 determines, by the touch sensor IC, that the arm 300 is not in contact with the determination terminal of the multi-use circuit 130, the processor 110 makes a worn/removed determination that "the wearable device 100, 101, 102 is not being worn on the arm 300."

In the embodiments described above, a situation is envisioned in which the wearable device 100, 101, 102 is worn on the arm 300 (in particular, the wrist), but the location where the wearable device is worn is not limited to the arm 300. When the wearable device 100, 101, 102 is worn, any part that the determination terminal of the multi-use circuit 130 can be close to (for example, waist, leg, head, face, neck, chest, or the like) can be set as the wearing target. Additionally, the wearing target is not limited to a part of a human body, and any object that conducts electricity (for example, a metal pipe, a wire mesh, a reinforcing bar, or the like) can be set as the wearing target.

In the embodiments described above, the data transfer function and the charging function of the USB are envisioned as predetermined functions other than the worn/removed determination function of the multi-use circuit 130. However, the predetermined function is not limited thereto. For example, a configuration is possible in which the multi-use circuit 130 includes only the charging function or only the data transfer function as a predetermined function other than the worn/removed determination function. Moreover, these functions may be realized by terminals other than the terminals of the USB.

Note that the various functions of the wearable device 100, 101, 102 can be implemented by a computer such as a typical PC. Specifically, in the embodiments described above, examples are described in which the programs, such as the worn/removed determination processing, performed by the wearable device 100, 101, 102 are stored in advance in the memory of the processor 110 or the ROM of the storage 120. However, a computer may be configured that is capable of realizing these various features by storing and distributing the programs on a non-transitory computer-readable recording medium such as a compact disc read-only memory (CD-ROM), a digital versatile disc (DVD), a magneto-optical, disc (MO), a memory card, and a USB memory, and reading out and installing these programs on the computer.

Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the programs and, under the control of the operating system (OS), executing the programs in the same manner as other applications/programs.

In the embodiments described above, the processor 110 is constituted by a micro-controller that includes a processor. However, when a plurality of input/output ports are provided, the processor 110 may be constituted by any processor unit such as a single processor, a multiprocessor, a multi-core processor, or the like. Additionally, a configuration is possible in which the processor 110 is constituted by combining a desired processor, and processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wearable device, comprising:
    a multi-use circuit that includes a plurality of electrical terminals provided so as to be able to be close to a subject and that is capable of being used for both (i) a determination function that determines whether the wearable device is being worn on the subject and (ii) a predetermined function other than the determination function;
    a determination circuit for enabling execution of the determination function, the determination circuit being connected to the multi-use circuit; and
    a processor configured to execute the determination function,
    wherein:
    the processor includes:
        a first port connected to a first terminal of the plurality of electrical terminals via a first connection wire of the multi-use circuit and to be used for data transfer via said first terminal of the plurality of electrical terminals,
a second port connected to the determination circuit, and
a third port connected to a second terminal of the plurality of electrical terminals via a second connection wire of the multi-use circuit and to be used for data transfer via said second terminal of the plurality of electrical terminals,
the wearable device further comprises a switcher which is operable to selectively connect the determination circuit to one of the first connection wire and the second connection wire,
upon execution of the determination function, the processor operates the switcher to connect the determination circuit to the first connection wire and outputs a predetermined worn/removed determination voltage from the second port to the first terminal via the determination circuit, the switcher, and the first connection wire, and the first port detects, via at least a portion of the determination circuit or the first connection wire, a voltage waveform corresponding to a voltage waveform of the predetermined worn/removed determination voltage output from the second port, and
in a case in which it is determined based on the voltage wave form detected by the first port that the wearable device is not being worn, the processor operates the switcher to disconnect the first connection wire from the determination circuit and to connect the second connection wire to the determination circuit and outputs the predetermined worn/removed determination voltage from the second port to the second terminal via the determination circuit, the switcher, and the second connection wire, and the third port detects, via at least a portion of the determination circuit or the second connection wire, a voltage waveform corresponding to the voltage waveform of the predetermined worn/removed determination voltage output from the second port.

2. The wearable device according to claim 1, wherein the processor, when executing the determination function, determines, based on a relationship between the voltage waveform of the worn/removed determination voltage and a voltage waveform of a voltage from the first terminal and which is detected by the first port, in a state in which the worn/removed determination voltage is being applied to the first terminal, whether the wearable device is worn on or removed from the subject, and
determines, based on a relationship between the voltage waveform of the worn/removed determination voltage and a voltage waveform of a voltage from the second terminal and which is detected by the third port, in a state in which the worn/removed determination voltage is being applied to the second terminal, whether the wearable device is worn on or removed from the subject.

3. The wearable device according to claim 2, wherein the processor determines, based on voltage being applied to a terminal among the plurality of electrical terminals, whether the plurality of electrical terminals are connected to another device other than the subject and the wearable device.

4. The wearable device according to claim 3, wherein the processor determines that the plurality of electrical terminals are connected to the another device when the voltage being applied to said terminal among the plurality of electrical terminals is greater than or equal to a predetermined reference voltage and an amount of fluctuation of the voltage being applied to said terminal is less than or equal to a predetermined amount of reference fluctuation.

5. The wearable device according to claim 1, wherein the processor
determines whether the plurality of electrical terminals are connected to another device other than the subject and the wearable device, and
executes the determination function by cooperating with the multi-use circuit and the determination circuit when a determination is made that the plurality of electrical terminals are not connected to the another device.

6. The wearable device according to claim 2, wherein the processor
determines whether the terminal is connected to another device other than the subject and the wearable device, and
executes the determination function by cooperating with the multi-use circuit and the determination circuit when a determination is made that the plurality of electrical terminals are not connected to the another device.

7. The wearable device according to claim 3, wherein the processor
determines whether the plurality of electrical terminals are connected to the another device other than the subject and the wearable device, and
executes the determination function by cooperating with the multi-use circuit and the determination circuit when a determination is made that the plurality of electrical terminals are not connected to the another device.

8. The wearable device according to claim 4, wherein the processor
determines whether the wearable device is connected to the another device other than the subject and the wearable device, and
executes the determination function by cooperating with the multi-use circuit and the determination circuit when a determination is made that the plurality of electrical terminals are not connected to the another device.

9. The wearable device according to claim 1, wherein the plurality of electrical terminals include a data transfer terminal as the first terminal or the second terminal, and
the processor executes the determination function by cooperating with the data transfer terminal and the determination circuit.

10. The wearable device according to claim 2, wherein the plurality of electrical terminals include a data transfer terminal as the first terminal or the second terminal, and
the processor executes the determination function by cooperating with the data transfer terminal and the determination circuit.

11. The wearable device according to claim 3, wherein the plurality of electrical terminals include a data transfer terminal as the first terminal or the second terminal, and
the processor executes the determination function by cooperating with the data transfer terminal and the determination circuit.

12. The wearable device according to claim 4, wherein the plurality of electrical terminals include a data transfer terminal as the first terminal or the second terminal, and
the processor executes the determination function by cooperating with the data transfer terminal and the determination circuit.

13. The wearable device according to claim 5, wherein the plurality of electrical terminals include a data transfer terminal as the first terminal or the second terminal, and the processor executes the determination function by cooperating with the data transfer terminal and the determination circuit.

14. The wearable device according to claim 1,
wherein the switcher is operable to connect and disconnect the determination circuit to and from the multi-use circuit;
wherein the processor executes the determination function by connecting the determination circuit to the multi-use circuit via one of the first connection wire and the second connection wire by operation of the switcher and cooperating with the multi-use circuit and the determination circuit when a determination is made that the plurality of electrical terminals are not connected to another device other than the subject and the wearable device.

15. The wearable device according to claim 2,
wherein the switcher is operable to connect and disconnect the determination circuit to and from the multi-use circuit;
wherein the processor
executes the determination function by connecting the determination circuit to the multi-use circuit via one of the first connection wire and the second connection wire by operation of the switcher and cooperating with the multi-use circuit and the determination circuit when a determination is made that the plurality of electrical terminals are not connected to another device other than the subject and the wearable device.

16. The wearable device according to claim 3,
wherein the switcher is operable to connect and disconnect the determination circuit to and from the multi-use circuit; and
wherein the processor executes the determination function by connecting the determination circuit to the multi-use circuit via one of the first connection wire and the second connection wire by operation of the switcher and cooperating with the multi-use circuit and the determination circuit when a determination is made that the plurality of electrical terminals are not connected to the another device other than the subject and the wearable device.

17. The wearable device according to claim 4,
wherein the switcher is operable to connect and disconnect the determination circuit to and from the multi-use circuit;
wherein the processor executes the determination function by connecting the determination circuit to the multi-use circuit via one of the first connection wire and the second connection wire by operation of the switcher and cooperating with the multi-use circuit and the determination circuit when a determination is made that the plurality of electrical terminals are not connected to another device other than the subject and the wearable device.

18. A worn/removed determination method by a wearable device including (I) a processor, (II) a multi-use circuit that includes a plurality of electrical terminals provided so as to be able to be close to a subject and that is capable of being used for both (i) a determination function that determines whether the wearable device is being worn on the subject and (ii) a predetermined function other than the determination function, (III) a determination circuit for enabling execution of the determination function, the determination circuit being connected to the multi-use circuit, wherein the processor includes (i) a first port connected to a first terminal of the plurality of electrical terminals via a first connection wire of the multi-use circuit and to be used for data transfer via the first terminal of the plurality of electrical terminals, (ii) a second port connected to the determination circuit, and (iii) a third port connected to a second terminal of the plurality of electrical terminals via a second connection wire of the multi-use circuit and to be used for data transfer via said second terminal of the plurality of electrical terminals, and (IV) a switcher which is operable to selectively connect the determination circuit to one of the first connection wire and the second connection wire, the method comprising:
determining, by the processor, whether the plurality of electrical terminals are connected to another device other than the subject and the wearable device; and
executing, by the processor, the determination function when a determination is made that the plurality of electrical terminals are not connected to the another device,
wherein executing the determination function comprises:
operating the switcher to connect the determination circuit to the first connection wire and outputting a predetermined worn/removed determination voltage from the second port to the first terminal via the determination circuit, the switcher, and the first connection wire, and detecting, by the first port of the processor, via at least a portion of the determination circuit or the first connection wire, a voltage waveform corresponding to a voltage waveform of the predetermined worn/removed determination voltage output from the second port, and
in a case in which it is determined based on the voltage wave form detected by the first port that the wearable device is not being worn, operating the switcher to disconnect the first connection wire from the determination circuit and to connect the second connection wire to the determination circuit and outputting the predetermined worn/removed determination voltage from the second port to the second terminal via the determination circuit, the switcher, and the second connection wire, and detecting, by the third port of the processor, via at least a portion of the determination circuit or the second connection wire, a voltage waveform corresponding to the voltage waveform of the predetermined worn/removed determination voltage output from the second port.

19. A non-transitory computer-readable recording medium storing a program that is executable by a processor of a wearable device comprising (I) the processor, (II) a multi-use circuit that includes a plurality of electrical terminals provided so as to be able to be close to a subject and that is capable of being used for both (i) a determination function that determines whether the wearable device is being worn on the subject and a (ii) predetermined function other than the determination function, (III) a determination circuit for enabling execution of the determination function, the determination circuit being connected to the multi-use circuit, wherein the processor includes (i) a first port connected to a first terminal of the plurality of electrical terminals via a first connection wire of the multi-use circuit and to be used for data transfer via said first terminal of the plurality of electrical terminals, (ii) a second port connected to the determination circuit, and (iii) a third port connected to a second terminal of the plurality of electrical terminals via a second connection wire of the multi-use circuit and to be used for data transfer via said second terminal of the plurality of electrical terminals, and (IV) a switcher which is operable to selectively connect the determination circuit to one of the first connection wire and the second connection wire, the program causing the processor to:

determine whether the plurality of electrical terminals are connected to another device other than the subject and the wearable device; and execute the determination function when a determination is made that the plurality of electrical terminals are not connected to the another device, wherein upon execution of the determination function, the processor operates the switcher to connect the determination circuit to the first connection wire and outputs a predetermined worn/removed determination voltage from the second port to the first terminal via the determination circuit, the switcher, and the first connection wire, and the first port detects, via at least a portion of the determination circuit or the first connection wire, a voltage waveform corresponding to a voltage waveform of the predetermined worn/removed determination voltage output from the second port, wherein, in a case in which it is determined based on the voltage wave form detected by the first port that the wearable device is not being worn, the processor operates the switcher to disconnect the first connection wire from the determination circuit and to connect the second connection wire to the determination circuit and outputs the predetermined worn/removed determination voltage from the second port to the second terminal via the determination circuit, the switcher, and the second connection wire, and the third port detects, via at least a portion of the determination circuit or the second connection wire, a voltage waveform corresponding to the voltage waveform of the predetermined worn/removed determination voltage output from the second port.

* * * * *